United States Patent Office 2,991,752
Patented July 11, 1961

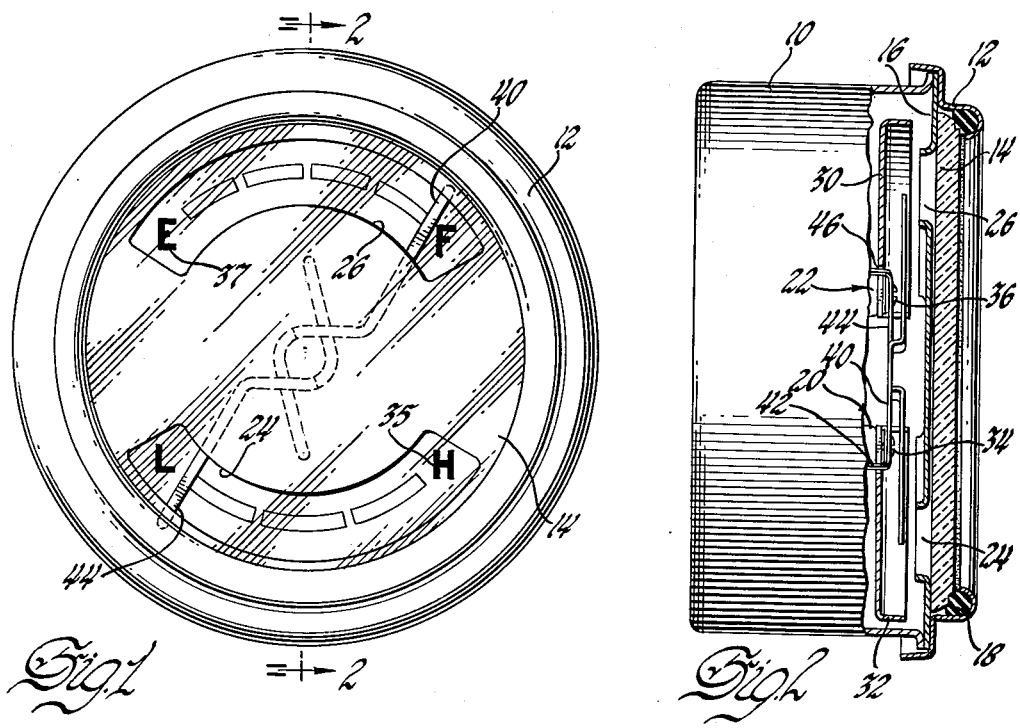
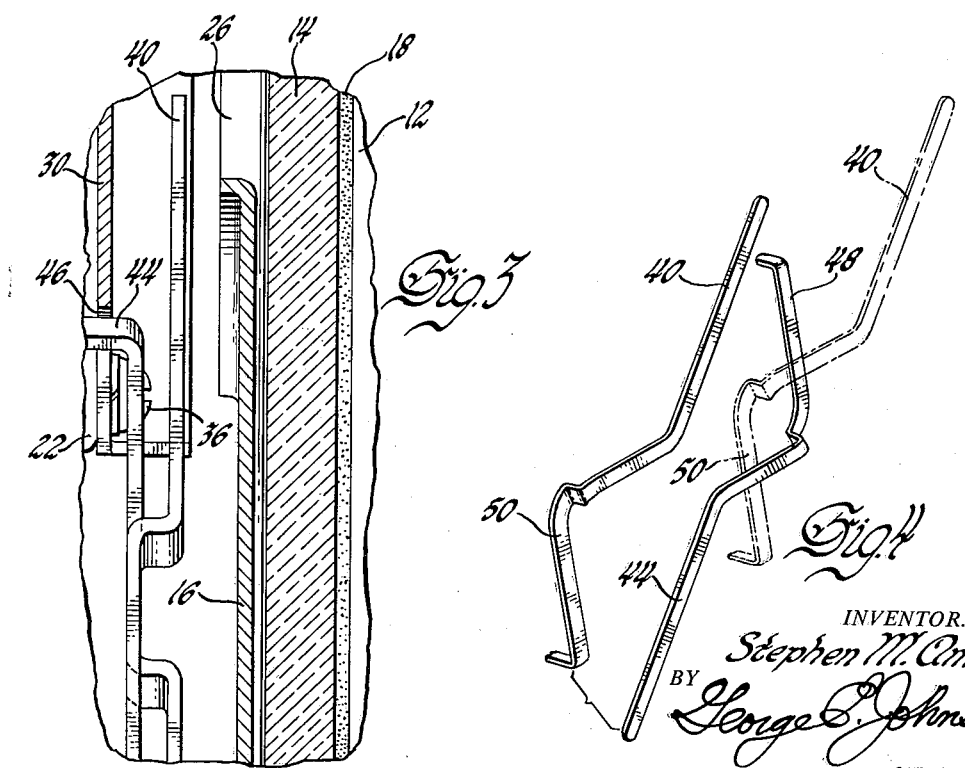

2,991,752
TWO POINTER INSTRUMENTS
Stephen M. Amos, Denver, Colo., assignor to General Motors Corporation, Detroit, Mich., a corporation of Delaware
Filed May 18, 1959, Ser. No. 813,809
3 Claims. (Cl. 116—136.5)

This invention relates to instruments such as electrically operated gauges and particularly to instruments in which pointers are employed in registry with dials to indicate readings such as pertaining to fuel level, temperature, amperage, etc.

In dial-type instruments it is frequently advantageous to group two instruments as closely together as possible in the interest of space conservation. It is also advantageous even though the space limitations are existent to retain as large scales as possible to enhance readability.

An object of the present invention is to provide an improved instrument in which two pointers are arranged in cooperation with dial means in such a way that each pointer is capable of a large angle of deflection independent of the other.

Another object of the invention is to provide an instrument having two pointers so arranged as to permit their registry with scales which are large despite compactness of the instrument.

To these ends, a feature of the invention is an instrument having two pointers extending in opposite directions parallel with dial means, each of the pointers crossing over and under the other and capable of large scale deflection.

These and other important features of the invention will now be described in detail in the specification and then pointed out more particularly in the appended claims.

In the drawings:
FIGURE 1 is a front view of an instrument showing one embodiment of the present invention;
FIGURE 2 is a side view of the instrument, a partial section being taken along the line 2—2 of FIGURE 1;
FIGURE 3 is an enlarged view of a portion of the sectional parts shown in FIGURE 2; and
FIGURE 4 is a perspective and exploded view of the two pointers shown in FIGURE 1, one pointer being shown also in dot-and-dash lines representing a crossover positional relationship with the other pointer in the actual instrument.

In the drawings, the instrument is shown as including a casing 10 with a bezel 12 retaining a transparent plate 14 and a metal mask plate 16 on the open end of the casing 10. A tight joint between the bezel 12 and the glass plate 14 is maintained by a rubber O-ring 18.

The mechanisms within the casing 10 are not disclosed specifically herein but they are of the type generally used in instruments for electrically indicating liquid level and battery charging rate. In the instant disclosure a mechanism 20 (such as disclosed in Patent #1,942,529, granted January 9, 1934, in the name of E. F. Bacon) is installed in the lower half of the casing 10 to serve as a fuel supply indicator. Another instrument 22 (such as disclosed in Patent #2,047,763, granted July 14, 1936, in the name of E. F. Bacon) is installed in the upper portion of the casing 10 for indicating a battery charging rate. These instruments form no part of the present invention and they are each conventionally known to be such as to operate electrically to rotate a pointer to give a reading in accordance with the conditions obtaining.

The mask plate 16 is provided with two arcuate openings 24 and 26. These are formed in the plate about a common axis which is the center line of the plate 14 and the casing 10. Inside the casing 10 and immediately to the rear of the upper portion of the plate 16 is a dial 30. It is made of sufficient size to overlap the boundaries of the opening 26. A similar dial 32 is located in the bottom half of the casing to overlap the opening 24. These dials are fastened to the instruments 20 and 22 by means of screws 34 and 36 respectively. If desired, the dial means 30—32 may be made of one plate instead of from two pieces as shown but it will be understood that the dial means advantageously bear indicia 35 and 37 which show through the two openings 24 and 26 respectively.

The mechanism 20 indicating fuel level is provided with a pointer 40 one end of which extends through the dial at 42. A second pointer 44 extends through the dial 30 at 46 for operation by the mechanism 22.

The two pointers 40 and 44 extend in opposite directions and parallel with the dial means so that the pointer 44 of the upper mechanism 22 registers with the dial 32 in the lower half of the casing 10 and the pointer 40 of the lower instrument 20 registers with the dial 30 in the upper part of the casing 10.

In order to prevent the pointers from contacting or interfering with each other, i.e., to enable them to operate independently, intermediate portions 48 and 50 of the pointers are offset from each other. Because of this arrangement or form of the pointers, they interlock but are out of contact within the range of movement of the pointers as required by the dial means. It will be noted that each of the pointers crosses over and under the other pointer.

Because of this arrangement each pointer may be of greater length within the confines of the instrument and yet avoid interference with the movement of the other pointer. The longer pointer gives a longer arcuate scale length than would otherwise be possible for a given angular pointer deflection.

I claim:

1. An instrument including dial means with two scales, two pointers rotatable on spaced parallel axes and in planes parallel with a face of said dial means, spaced means for rotating said pointers on said axes, and each of said pointers registering with a scale located beyond the axis of the other pointer and having an intermediate portion extending over and under and out of contact with the other pointer.

2. An instrument including dial means having two arcuate scales, two pointers spaced from each other and rotatable around spaced axes located between said scales and in planes parallel with said dial means, separate means for actuating said pointers, an intermediate portion of each one of said pointers crossing over and under the other pointer with sufficient clearance to permit deflection of a free end of each pointer along the entire length of one of said scales, and said free end of each pointer registering with one of said scales beyond the axis of the other pointer.

3. An instrument including dial means with two arcuate scales, two pointers having spaced pivotal axes extending normal to said dial means, separate means for actuating each pointer through its axis and in cooperative relation with one of said scales, the axis of each of said pointers being located between the axis and scale of the other pointer, an indicating end portion of each of said pointers being free and registering with its cooperating scale beyond the axis of the other pointer, and an intermediate portion of each of said pointers extending over and under an intermediate portion of the other to permit full scale deflection of each pointer independent of the other pointer.

References Cited in the file of this patent

UNITED STATES PATENTS

| | | |
|---|---|---|
| 1,717,653 | Berge | June 18, 1929 |
| 2,123,376 | Moeger | July 12, 1938 |

FOREIGN PATENTS

| | | |
|---|---|---|
| 632,747 | Germany | July 16, 1936 |